July 8, 1930.  B. H. REEVES  1,770,144
REFLECTING DEVICE
Filed June 6, 1928

INVENTOR
Beanford H. Reeves
BY
ATTORNEY

Patented July 8, 1930

1,770,144

UNITED STATES PATENT OFFICE

BEAUFORD H. REEVES, OF NEW HAVEN, CONNECTICUT, ASSIGNOR TO RAY-SIGNS CORPORATION, A CORPORATION OF DELAWARE

REFLECTING DEVICE

Application filed June 6, 1928. Serial No. 283,166.

My invention relates to reflecting devices such as signs or other indicators which employ a single or plurality of reflecting units which appear luminous when struck by rays of light emanating from some external source. Units of this type are well known and are shown in the patent to Murray #1,625,905, issued April 26, 1927, and reissued as #16,863 on January 31, 1928. It is important in a device utilizing a plurality of these units that the axes of the units be parallel. It is also very desirable that the reflecting units be mounted in such a manner that they may be readily removed for replacement purposes the latter being true whether a single unit or a plurality of units go to make up the reflecting device.

It is the purpose of my invention, therefore, to provide a suitable mounting for supporting a single or plurality of reflecting units in a reflecting device in a manner that permits removal of one or more of the units if necessary and yet protects them against destruction from vibration or other abuse to which the reflecting device may be subjected. It is also an object of my invention to provide a mounting for the units that will automatically align the units with their axes parallel when a plurality of them are used, in a single sign or other reflecting device.

I accomplish these objects by providing a front plate which embodies means for locating the reflecting units in desired position and by providing a base or back plate for retaining the units in the positions allocated by the front plate with their axes parallel. I also provide means for retaining the units against the base plate, the latter means preferably being a resilient or yielding means such as a spring. The front plate and base plate are rigidly secured together by any suitable mechanical means.

A better understanding of my device will be had from a consideration of the detailed description taken in connection with the drawings.

Figure 1:
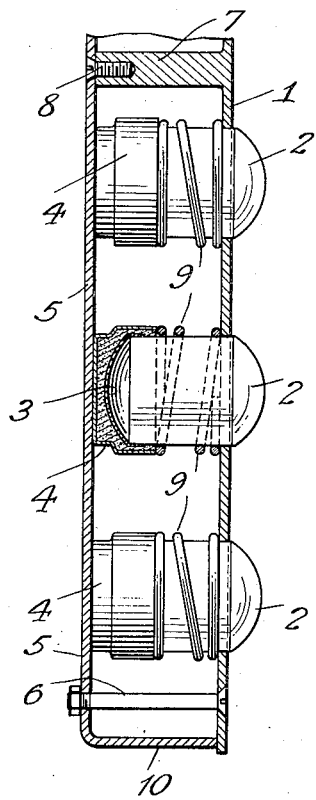
Figure 2:
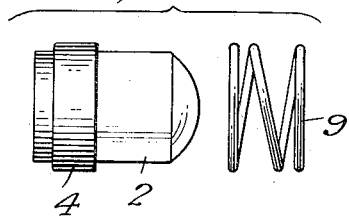

Fig. 1 is a section through a portion of a reflecting device showing three reflecting units mounted in accordance with my invention, and Fig. 2 is an elevation of a reflecting unit and the spring utilized for holding the unit against the base plate.

In the illustrated form of my invention I have shown a front plate 1 having a series of apertures therein through which the lens 2 of the reflecting unit may project. Each reflecting unit comprises a lens 2, having one end convex and the other end plane the axial length of the lens being approximately twice the radius of curvature of the convex end, a reflector 3 and a cap or base 4 the outer end surface of the latter being perpendicular to the axis of the lens. The reflecting units may thus be positioned to outline any desired configuration. The apertures are preferably of such diameter that the lenses of the reflecting units fit snugly therein and are thus limited from any transverse movement. A back or base plate 5 is secured in spaced relation to the front plate by means of through bolts 6 and lugs 7 and screws 8, it being understood, of course, that either of these forms or both, or any other suitable means may be employed to rigidly secure the base plate and the front plate together. The base plate serves as a base or support for the caps or bases 4 of the reflecting units. The base plate 5 is preferably made of sheet metal and secured in parallel relationship to the front plate as by this construction the inner surface of the base plate lying in one plane will support the units in parallel relationship inasmuch as the units are constructed with their caps perpendicular to the axes of the lenses. It will be understood, of course, that it is only essential that those portions of the inner surface of the base plate contacting with the caps of the reflecting units need be parallel in order to support the reflecting units in desired position. In order to insure contact of the cap of the reflecting unit with the inner surface of the base plate and to securely hold the unit in place against displacement there is provided a coiled compression spring 9 of suitable diameter to surround the lens of the unit and to bear against the upper edge of the unit cap. This spring is placed over the lens before the unit is inserted in place and being under compression urges the cap of the unit against the inner surface of the base plate thus insuring constant contact between the base plate and the cap.

In order to make a completely closed device the base plate is flanged at its edges as at 10 to enclose the entire device, it being understood, of course, that any other suitable enclosure means may be provided.

From the foregoing it will be seen that I have provided a very simple mounting for a reflecting unit used to make up a reflecting device. The units may be mounted in such a way that their axes are assured of being parallel, in such a way that the units may be readily replaced if broken, and in such a manner that the entire device is mechanically secured and free from displacement due to any vibration or other disturbances.

It is obvious that minor changes may be made in the details of structure without departing from the spirit and scope of this invention as defined in the appended claims.

I claim:

1. In a light reflecting device, a reflecting unit, a front plate having an aperture therein through which a portion of said reflecting unit may project, a base plate secured in spaced relation thereto and serving as a base for the reflecting unit, and a compression spring surrounding said unit and bearing against said unit and said front plate, said spring serving to urge the unit in contact with said base plate.

2. In a reflecting device, a plurality of reflecting units, a perforate front positioning plate through which the units may project, the perforations substantially fitting the units, a base plate secured to said front plate in spaced relation thereto, said base plate serving as a seat for said units and to retain said units relatively parallel and means for holding said units in contact with said base plate.

3. In a reflecting device, a plurality of reflecting units, a perforate front positioning plate through which the units may project, the perforations substantially fitting the units, a base plate secured to said front plate in spaced relation thereto, said base plate serving as a seat for said units and to retain said units relatively parallel, and means for holding said units in contact with said base plate, said latter means comprising a spring positioned between said unit and said front plate.

4. In a light reflecting device, a substantially cylindrical reflecting unit, a front plate having a circular aperture therein within which the front end of the unit is received and which fits about the unit and permits it to extend more or less therethrough, a base plate in the rear of the front plate secured in fixed relation thereto, and means for retaining the rear end of the unit against the base plate.

5. In a light reflecting device, a substantially cylindrical reflecting unit, a front plate having a circular aperture therein within which the front end of the unit is received and which fits about the unit and permits it to extend more or less therethrough, a base plate fixedly secured to the front plate, and means for retaining the rear end of the unit against the base plate.

6. In a light reflecting device, a substantially cylindrical reflecting unit, a front plate having a circular aperture therein within which the front end of the unit is received and which fits about the unit and permits it to extend more or less therethrough, a base plate fixedly secured to the front plate, and means for resiliently retaining the rear end of the unit against the base plate.

7. In a light reflecting device, a reflecting unit, a front plate having an aperture therein through which the front end of the unit projects, a base plate fixedly secured in the rear of the front plate and bearing against the rear end of the unit, and means resiliently urging the unit rearwardly against said base plate.

8. In a light reflecting device, a reflecting unit, a front plate having an aperture therein through which the front end of the unit projects, a base plate fixedly secured in the rear of the front plate and bearing against the rear end of the unit, and resilient means coacting with the front plate and the unit resiliently urging the unit rearwardly against said base plate.

9. In a light reflecting device, a reflecting unit comprising a substantially cylindrical lens member and a reflector at its rear end and a cap enclosing its rear end, a front plate having an aperture therein through which the front end of the unit projects, a base plate in the rear thereof, and a compression spring surrounding the lens member and bearing against the cap and the front plate and serving to urge the unit with its rear end against the base plate.

In witness whereof, I hereunto subscribe my signature.

BEAUFORD H. REEVES.